A. B. BREUER.
FUEL ADMISSION VALVE FOR INTERNAL COMBUSTION ENGINES.
APPLICATION FILED MAY 11, 1912.
1,042,076.
Patented Oct. 22, 1912.
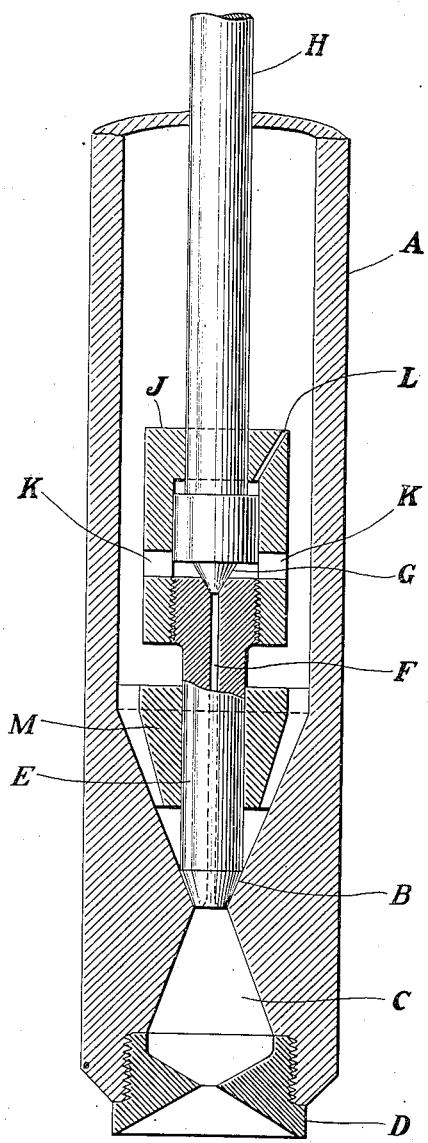
WITNESSES:
Fred H. Miller
B. B. Hines
INVENTOR
Armand Baudy Breuer
BY
Wesley S. Carr
ATTORNEY

UNITED STATES PATENT OFFICE.

ARMAND BANDY BREUER, OF BUDAPEST, AUSTRIA-HUNGARY.

FUEL-ADMISSION VALVE FOR INTERNAL-COMBUSTION ENGINES.

1,042,076.  Specification of Letters Patent.  Patented Oct. 22, 1912.

Application filed May 11, 1912. Serial No. 696,802.

*To all whom it may concern:*

Be it known that I, ARMAND BANDY BREUER, a subject of the Kingdom of Hungary, residing at Budapest, Austria-Hungary, engineer, have made new and useful Improvements in Fuel-Admission Valves for Internal-Combustion Engines, of which the following is a specification.

This invention relates to fuel-admission valves for internal-combustion engines adapted to operate with liquid fuel and more particularly to valves adapted to inject the liquid fuel into the cylinder or combustion chamber of the engine against a considerable pressure therein.

The object of the present invention is to provide an improved liquid fuel-admission valve of the above kind which consists of few parts, is of simple construction, is readily adjustable to suit varying conditions and by means of which the liquid fuel may be more completely and satisfactorily vaporized with a lower air pressure than with valves of this kind as at present constructed.

According to this invention the improved fuel-admission valve is provided with separate inlet passages for air and liquid fuel, the construction and arrangement of the parts of the valve being such that when the same is operated the passage for the air is opened in advance of the opening of the fuel-admission passage. The air and liquid fuel, after passing through the respective passages in the valve, enter an expansion chamber, the dimensions and shape of which are such that the velocity of the issuing air is increased and a thorough vaporization of the liquid fuel and admixture thereof with the air is obtained. The spray nozzle of the expansion chamber through which the fuel passes perfectly vaporized into the cylinder or combustion chamber of the engine is preferably formed in a removable cap or casing so as to readily permit of the size or shape of this nozzle being changed to suit varying conditions of load, different varieties of fuel and so forth.

The accompanying drawing is a sectional view of a fuel-admission valve constructed in accordance with this invention.

As shown in the drawing, the valve comprises a cylindrical casing A having a contraction near its lower end in which is formed a conical valve seat B and an expansion chamber C located in the casing below the valve seat, this chamber being, as shown, substantially conical in shape. The expansion chamber terminates in a spray nozzle D for vaporizing the fuel which is preferably formed, as shown, in a plug or cap screwed into the casing A so as to be readily removable. A plunger E, the lower end of which is adapted to seat on the valve seat B and constitutes the valve for controlling the admission of liquid fuel, is traversed throughout its length by a central air passage F, the upper end of which is adapted to be closed by a valve G, at the end of the valve-operating rod H. The lower end of the passage F is so shaped that the air passing through it enters the expansion chamber in the form of a cone or funnel, with the result that the liquid fuel, which afterward flows into the expansion chamber past the valve seat B, cannot pass unvaporized through the spray nozzle D into the cylinder or the combustion chamber of the engine.

Screwed to the upper end of the plunger E is a cap J into which the valve operating rod H projects. The lower end of the valve-operating rod above the valve G is enlarged so as to slide easily within the cap J which thus forms a guide for said rod. The cap J has a number of radial openings K which provide communication between the interior of the casing A and the air passage F. A passage L provides communication between the interior of the casing A and the space in the interior of the cap above the enlarged end of the valve operating rod H.

It will be observed that the operating rod H can move a certain distance after the valve G has been opened before coming in contact with the upper end of the cap J, after which further movement of the rod H will lift the plunger E away from the valve seat B. The plunger E, in its movements toward and away from the valve seat B, is guided by a distributer M that is located in the lower part of the casing A a short distance above the valve seat B.

The plunger E is maintained on the valve seat B by the pressure of air on the surface surrounding the valve G and not by the valve rod H when the valve G at its end closes the air passage F in the plunger.

The operation of the device is as follows:—The liquid fuel is admitted to the casing A through the usual supply ports at the inner end of the casing, and compressed air is also supplied to the casing A through suitable ports, similarly located at the inner end of the casing. These features are not shown in the drawing. When the valve-operating rod H lifts, the valve G is opened, and air immediately flows through the passage F into the expansion chamber C. Continued movement of the operating rod H in the upward direction will cause the plunger E to lift and open the valve B whereupon liquid fuel and air will also be admitted through the valve into the expansion chamber C, in which the fuel and air become thoroughly mixed and, on passing into the combustion chamber or cylinder, are completely vaporized by the spray nozzle D. Practically air only enters the expansion chamber C, when the valve G is first opened, for the reason that the liquid fuel in the casing is heavier than the particles of air and will be carried forward by gravity and by the air pressure to a point adjacent the valve seat B. It may be, however, that some liquid fuel will be so mixed with the air as to enter the chamber C by way of the passage F, but the amount will be small and the air substantially free from the liquid fuel. Movement of the valve-operating rod H in the opposite direction will first permit the plunger E to close the valve B, and a further movement of the rod H downward will cause the valve G to close the air passage F.

The valve mechanism described above may be readily adjusted to meet varying conditions of operation of the engine by varying the size or formation of the spray nozzle D. This, as described and shown in the drawing, is formed in a removable plug so as to permit of the desired change being readily effected. The valve may also be adjusted by varying the relative times at which the air and liquid passages are opened by altering the amount of lost motion between the plunger E and the valve operating rod H, this being effected by rotating the screwed cap J in the one or the other direction.

The fuel-admission valve illustrated in the accompanying drawing has been described by way of example only as showing one form in which the invention may be carried into effect and it is to be understood that the invention is not limited to the constructional details shown and described as these may obviously be varied within the scope of the appended claims.

What I claim is:

1. A fuel admission valve for internal combustion engines, including a casing having a spray nozzle, an expansion chamber adjacent to and supplying said nozzle with fuel, a fuel-delivering passage leading to said expansion chamber, a separate air-delivering passage leading to said expansion chamber, devices for closing said passages, and means common to said devices for operating the same, whereby air is first admitted to said expansion chamber and then air and fuel admitted thereto.

2. A fuel admission valve for internal combustion engines including a casing having a spray nozzle, an expansion chamber adjacent said nozzle, a fuel-delivering passage leading to said expansion chamber, a plunger for closing said passage, said plunger extending to a point in said casing some distance from said chamber and having an air passage therethrough, a device for closing said air passage, and means common to said device and said plunger for operating the same, whereby first air is delivered to said expansion chamber, and then air and fuel admitted thereto.

3. A fuel admission valve for internal combustion engines, including a casing having a spray nozzle and an expansion chamber adjacent said nozzle, a fuel-delivering passage leading to said expansion chamber, a plunger for closing said passage, said plunger extending to a point in said casing some distance from said chamber and having an air passage centrally therethrough, means in said casing for supporting said plunger, said supporting means having fuel passages extending therethrough, a rod for reciprocating said plunger, said rod having a valve for closing the air passage through said plunger, the connection between the rod and the plunger permitting said rod to move first independent of the plunger, whereby air is admitted through the passage, and then move the plunger, whereby air and fuel are admitted to the expansion chamber through the fuel supply passage.

4. A fuel admission valve for internal combustion engines, including a casing having a spray nozzle, an expansion chamber adjacent said nozzle, a fuel-delivering passage leading from said casing to said expansion chamber, a plunger for closing said passage, said plunger extending to a point in said casing some distance from said chamber, means in said casing for guiding said plunger, said plunger-guiding means having fuel-delivering passages therethrough, said plunger having an air passage centrally therethrough, an adjustable cap carried by said plunger and having air-receiving ports, whereby air is admitted to the passage through the plunger, a rod for operating said plunger, said rod having a valve on its inner end adapted to close the passage in said plunger, said rod above said valve being enlarged and having a limited movement in said cap, whereby the first movement of said rod will uncover the air passage through said plunger, and a further movement of said rod will move said plunger to uncover the fuel passage leading to the expansion chamber.

In testimony whereof I have hereunto subscribed my name this 22d day of April, 1912.

ARMAND BANDY BREUER.

Witnesses:
FRANCIS TREHURLY,
W. WEUYRAME.